United States Patent [19]

Geiser et al.

[11] Patent Number: 4,889,024
[45] Date of Patent: Dec. 26, 1989

[54] GUIDE-BAR DEVICE FOR A SINGLE SPINDLE LATHE

[75] Inventors: Markus Geiser, Péry; Pierre Juillerat, Moutier, both of Switzerland

[73] Assignee: Sameca SA, Lamboing, Switzerland

[21] Appl. No.: 251,992

[22] Filed: Sep. 29, 1988

Related U.S. Application Data

[63] Continuation of Ser. No. 886,604, Jul. 18, 1986, abandoned.

[30] Foreign Application Priority Data

Oct. 9, 1985 [CH] Switzerland ............ 03911/85

[51] Int. Cl.⁴ ............................. B23B 13/00
[52] U.S. Cl. ................................ 82/127; 82/124; 82/126; 414/17
[58] Field of Search ................ 82/2.5, 2.7, 127, 124, 82/126; 414/17, 18, 19, 20

[56] References Cited

U.S. PATENT DOCUMENTS

| Re. 29,905 | 2/1979 | Scheurer | 82/2.7 |
|---|---|---|---|
| 4,129,220 | 12/1978 | Peterson et al. | |
| 4,217,800 | 8/1980 | Furegati | 414/14 |
| 4,221,141 | 9/1980 | Oliver | 414/17 |
| 4,406,190 | 9/1983 | Mason | 414/17 |
| 4,507,992 | 4/1985 | Vandevoir et al. | 82/2.7 |
| 4,621,550 | 11/1986 | Berns | 414/17 |
| 4,624,611 | 11/1986 | Fabbri | 82/2.5 |

FOREIGN PATENT DOCUMENTS

| 0044815 | 1/1982 | European Pat. Off. | |
|---|---|---|---|
| 0107776 | 5/1984 | European Pat. Off. | |
| 121638 | 10/1984 | European Pat. Off. | 82/2.7 |
| 3409345 | 9/1984 | Fed. Rep. of Germany | 82/2.5 |
| 2247305 | 5/1975 | France | |
| 2512365 | 3/1983 | France | |
| 194801 | 11/1982 | Japan | 82/2.5 |
| 514381 | 12/1971 | Switzerland | |
| 0576304 | 6/1976 | Switzerland | |
| 0630824 | 7/1982 | Switzerland | |

Primary Examiner—Frederick R. Schmidt
Assistant Examiner—Robert Showalter
Attorney, Agent, or Firm—Marks Murase & White

[57] ABSTRACT

The device comprises a sectional carrier of closed cross section with a circular bed, a base and channels of distribution and return of oil. A guiding element comprising at least one guiding tube enclosing a bar stock to be machined and a push-piston is removably secured on the bed. The distribution channel communicates through radial openings with the guiding element for delivering to the latter oil under pressure which creates a hydrodynamic bearing supporting the bar stock when the latter is set into rotation by the head stock of the lathe. The sectional carrier has a great rigidity and stability which permits very high speeds of rotation of the bar stock to be machined. The return of oil by closed channels of the sectional carrier is protected against external contamination by impurities or dust.

25 Claims, 5 Drawing Sheets

GUIDE-BAR DEVICE FOR A SINGLE SPINDLE LATHE

This application is a continuation of application Ser. No. 886,604, filed July 18, 1986 now abandoned.

BACKGROUND OF THE INVENTION

1. Field of the Invention

The present invention relates to a guide-bar device for a single spindle lathe, comprising a sectional carrier on which is removably secured a guiding element for bar stock to be machined. The advance of the bar stock towards the lathe is controlled by a push-piston located in the guiding element. The device further comprises a distribution of oil under pressure, the oil being injected on the one hand at the rear of the push-piston for controlling its advance in the guiding tube and on the other hand between the bar stock to machined and the internal wall of the guiding element in order to create a hydrodynamic bearing for supporting the bar stock to be machined which is set into rotation by the head stock of the lathe.

2. Related Art

Such a guide-bar device is known from U.S. Pat. No. 4,507,992 of the same applicant. The known device comprises a U-shaped sectional carrier open at the top in which are mounted semi-cylindrical seats provided for sustaining the guiding tube. The guiding tube is removably secured on the seats by means of articulated clamps gripped by a nut. Such a device has numerous disadvantages. It is expensive to manufacture, because it comprises many parts which must be very carefully assembled in order to guarantee precise alignment and good support for the guiding tube. Furthermore, the rigidity and the stability of an open section is not ideal. The exchange of the guiding tube is too slow due to the presence of the clamps gripped by a nut. The oil which flows out from the front part of the guiding tube is returned to the hydraulic group by the U-shaped sectional carrier (open at the top) so that there is a risk of contamination of the oil by impurities and dust from the outside. Further, a lack of stability of the device causes undesirable vibrations which are transmitted to the bar stock in progress of machining which produces a poor machining quality.

The Swiss Patent CH 514 381 relates to a device for providing an automatic lathe with a bar stock to be machined. The device comprises a guiding tube for the bar stock and a push-piston for advancing the bar stock in its guiding-tube towards the lathe, the push-piston being engaged with play in the guiding-tube and connected by its back part to a source of oil under pressure. The oil flows through the play from the back part to the front part of the push-piston for soaking the bar stock. In this device, the oil soaking the bar stock must necessarily flow through the play from the back part to the front part of the push-piston so that the flow of oil under pressure cannot be controlled with sufficient precision for allowing high speeds of rotation of the bar stock.

The Swiss Patent CH 576 304 described a device of the same kind as the preceding one for providing an automatic lathe with bar stock to be machined. The push-piston which is engaged with play in the guiding-tube comprises an internal passage for the oil, this passage being parallel to the passage corresponding to the play between the push-piston and the guiding-tube and also being capable of adjustment by an adjusting means. However, the adjustment of the flow of oil under pressure delivered by the internal passage can only be accomplished by manual action on a valve of the push-piston when the machine is stopped and the push-piston is fully withdrawn from the guiding tube. This does not contribute to reduce the dead time of the machine.

The French patent application No. FR 2 512 365 relates to a tool-maker's lathe. The two head stocks each comprise a closed cross section. However, such a closed section is not foreseen for sustaining a guiding-tube nor for providing a distribution of oil under pressure.

SUMMARY OF THE INVENTION

It is an object of the present invention to realize a guide-bar device which does not present the above-mentioned disadvantages. The guide-bar device according to the invention must be of a simple design, perfectly stable and compact and it must permit very high machining speed of the bar stock to be machined without detriment to the machining quality. To solve this problem, the guide-bar device according to the invention comprises a sectional carrier of closed cross section with a base and a circular bed capable of receiving guiding elements of different executions and diameters. Oil distribution and return channels are provided in the sectional carrier. Due to the fact that the sectional carrier has a closed cross section, its moment of inertia is increased so that it has good rigidity and stability. Further, the sectional carrier serves as a return channel for the oil which flows out at the front part of the guiding element so that the returning oil is not in contact with the outside atmosphere which greatly reduces the risks of contamination of the oil. The guiding element is directly mounted on the bed of the sectional carrier so that the seats previously mentioned in connection with the related art are eliminated. Further, the guiding element is mounted and assembled on the sectional carrier by means of rapid action locking clamps which increases the rapidity of exchange of this element.

In accordance with a second aspect of the invention, the guiding element comprises a first, non-rotating tube removably secured to the sectional carrier. The first tube encloses a second tube which serves as a proper guiding tube for the bar stock to be machined. The second tube rotates freely inside the first tube when the bar stock is set into rotation by the head stock of the lathe. This measure permits substantial increases in the speed of rotation of the bar stock to be machined.

In accordance with a third aspect of the invention, the rigidity and stability of the device are improved by providing a closed box at the base of the sectional carrier. This box may be used as a tank for the oil flowing out from the device and it may contain the hydraulic group which permits the arrangement of the hydraulic pipes in the tank, these elements being then protected against contamination from the outside. The combination guide-bar device—box forms an independent unit intended to be mounted on single spindle lathes.

The present invention relates to each of the three aspects mentioned above, either taken alone or in any combination.

BRIEF DESCRIPTION OF THE DRAWINGS

The invention will be described further by way of example with reference to the accompanying drawings in which.

DETAILED DESCRIPTION OF THE INVENTION

Figure 1:
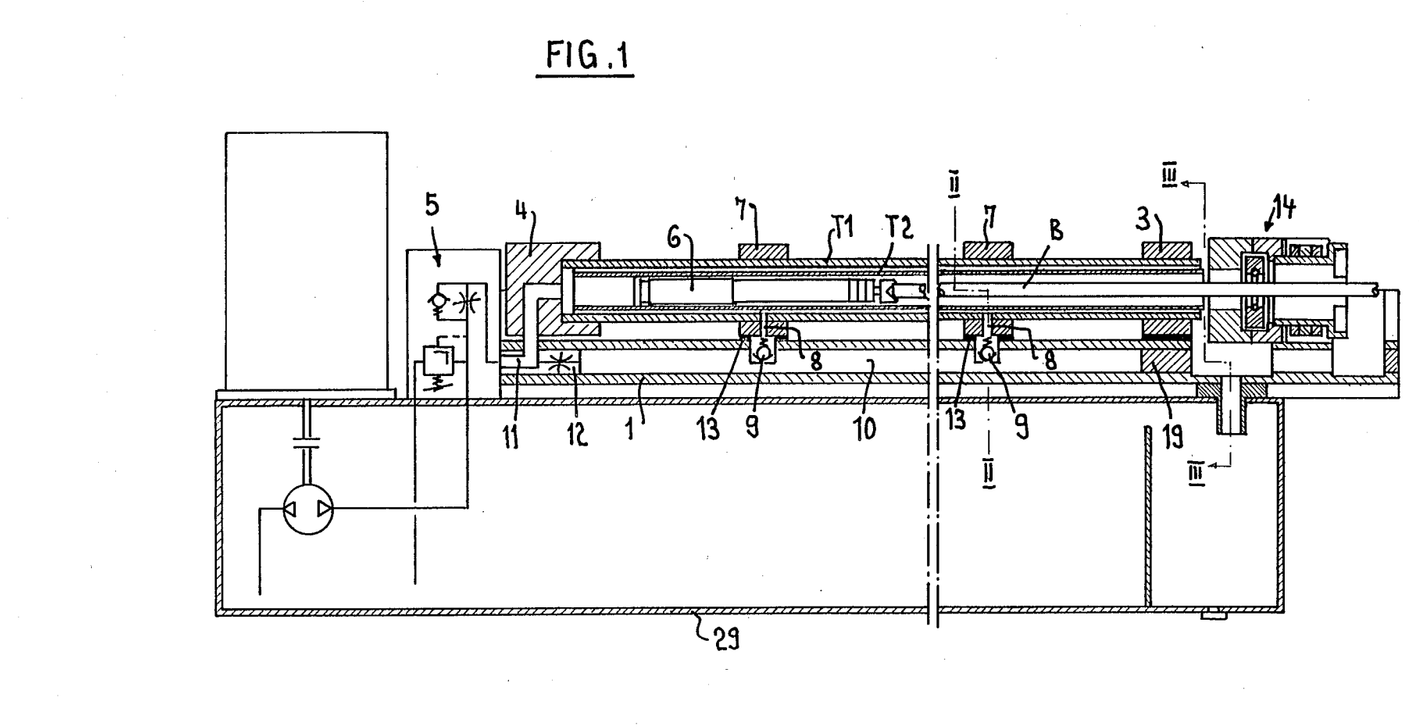
FIG. 1 is a longitudinal section of the device.
Figure 2:
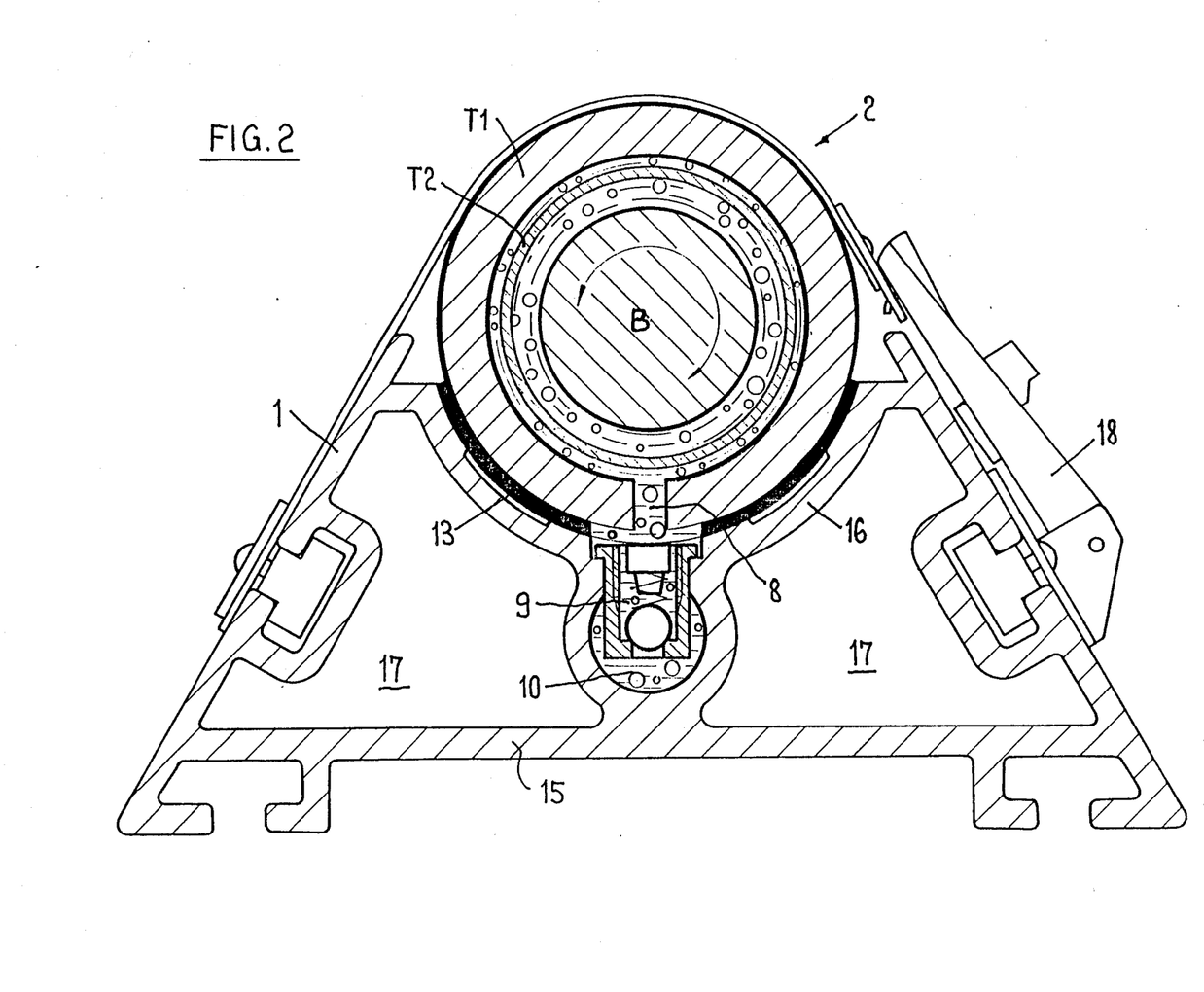
FIG. 2 is a sectional along the line II—II of FIG. 1.

In accordance with FIGS. 1 and 2, the device comprises a sectional carrier 1, a guiding element 2 mounted on front supports 3 and rear supports 4 of the device. It also comprises a hydraulic group 5 delivering oil under pressure as necessary to cause the advance or feed of a push-piston 6 located in the guiding element 2 and for providing oil injection in the annular chamber defined between the bar stock to be machined B and its guiding tube T1, respectively T2, in order to provide a hydrodynamic support for the bar stock when it is set into rotation within the guiding tube by the head stock of the lathe. The bar stock may be of circular or polygonal cross section. The guiding element 2 comprises centering collars 7 through which it rests on the sectional carrier 1. These centering collars comprise openings 8 communicating by non-return valves 9 with a channel 10 of the sectional carrier. The channel 10 provides a radial, lateral distribution of oil under pressure in the guiding element. The centering collars 7 are integral with the guiding element 2, and they are removed with this element when the latter must be exchanged. The device is connected to a hydraulic group 5 by a pipe 11 which is itself connected through the rear support 4 to the rear part of the guiding element 2 for delivering the oil under pressure necessary for causing the advance of the push-piston 6 towards the lathe. The pipe 11 is also connected by an adjustable valve 12 to the channel 10 of the sectional carrier 1. Resilient tight joints 13 are provided between the centering collars 7 and the sectional carrier 1. FIG. 1 shows that the sectional carrier is so designed that it can accept a rotary centering device 14 arranged between the outlet of the guiding element and the lathe.

FIG. 2 shows that the sectional carrier 1 is of a closed, substantially trapezoidal cross section with a base 15 and a circular bed 16. It is however not absolutely necessary that the cross section of the carrier be of trapezoidal shape, the essential thing being that the sectional carrier is closed and that it comprises a base 15 and a circular bed 16. The cross section of the sectional carrier 1 as illustrated in FIG. 2 shows that the latter has a very high moment of inertia which provides for high rigidity and stability of the device. The guiding element 2 rests on the bed 16 through the tight joints 13 the elasticity of which has the effect of absorbing the vibrations. The sectional carrier accepts guiding elements of different executions and diameters. The sectional carrier comprises a channel 10 which distributes oil under pressure to the non return valves 9 which in turn inject the oil between the bar stock to be machined B and its guiding tubes T1 and T2. The walls of the channel 10 contribute to increase the moment of inertia and the stability of the sectional carrier because they join the bed 16 to the base 15. This produces on each side of the walls of the channel 10 a closed space or chamber 17 which serves for the return of the oil flowing out from the front part of the guiding element 2. This oil is therefore returned to the pump and the hydraulic group 5 without any contamination from the outside. FIG. 2 shows further known rapid action locking clamps 18 which permit a fast removal and setting in place of the guiding element 2.

Figure 3:
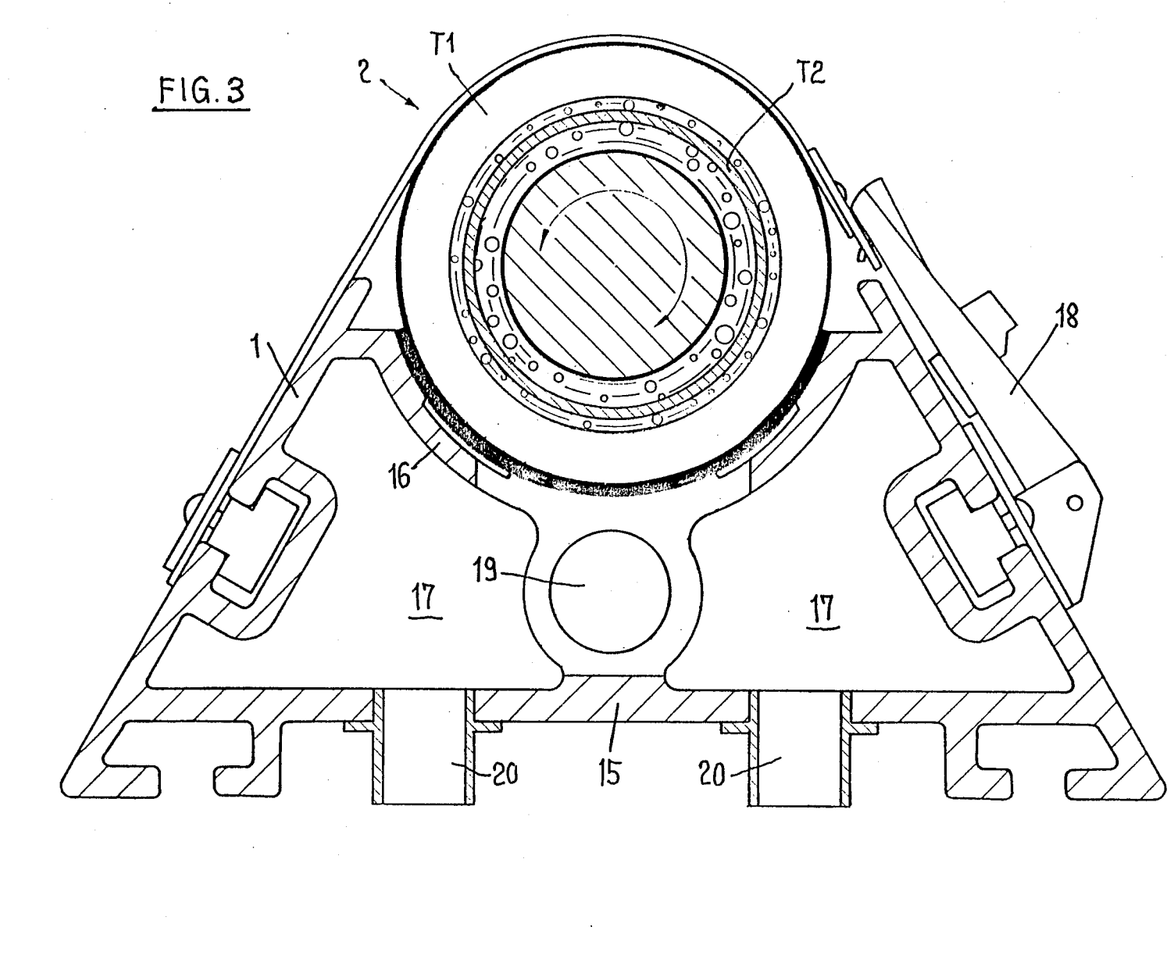
FIG. 3 is a section along the line III—III of FIG. 1.

FIG. 3 shows that the sectional carrier is open at its front part for permitting the oil flowing out from the front part of the guiding element to enter in the chambers 17 and to escape by the outlets 20 connected to the pump. There is provided a plug 19 for closing the front part of the channel 10.

The guiding element of FIGS. 1 to 3 comprises a first, external, non-rotating tube T1 mounted on the sectional carrier 1 as described above and secured to the latter by rapid action locking clamps 18. A second tube or guiding tube T2 having a thin wall is enclosed with play in the first, fixed tube T1. This second tube T2 which will be designated hereafter as the floating tube is entirely free within the tube T1 and it encloses the bar stock to be machined B and the push-piston 6 which causes the feed of the bar stock towards the lathe under the action of oil under pressure delivered by the hydraulic group 5. Due to the fact that the floating tube T2 does not comprise any radial opening and that it is entirely free in the fixed tube T1, special measures must be taken for ensuring that oil necessary for forming hydrodynamic bearing is injected between the bar stock to be machined B and the internal wall of the floating tube T2.

Figures 4, 5, 6:
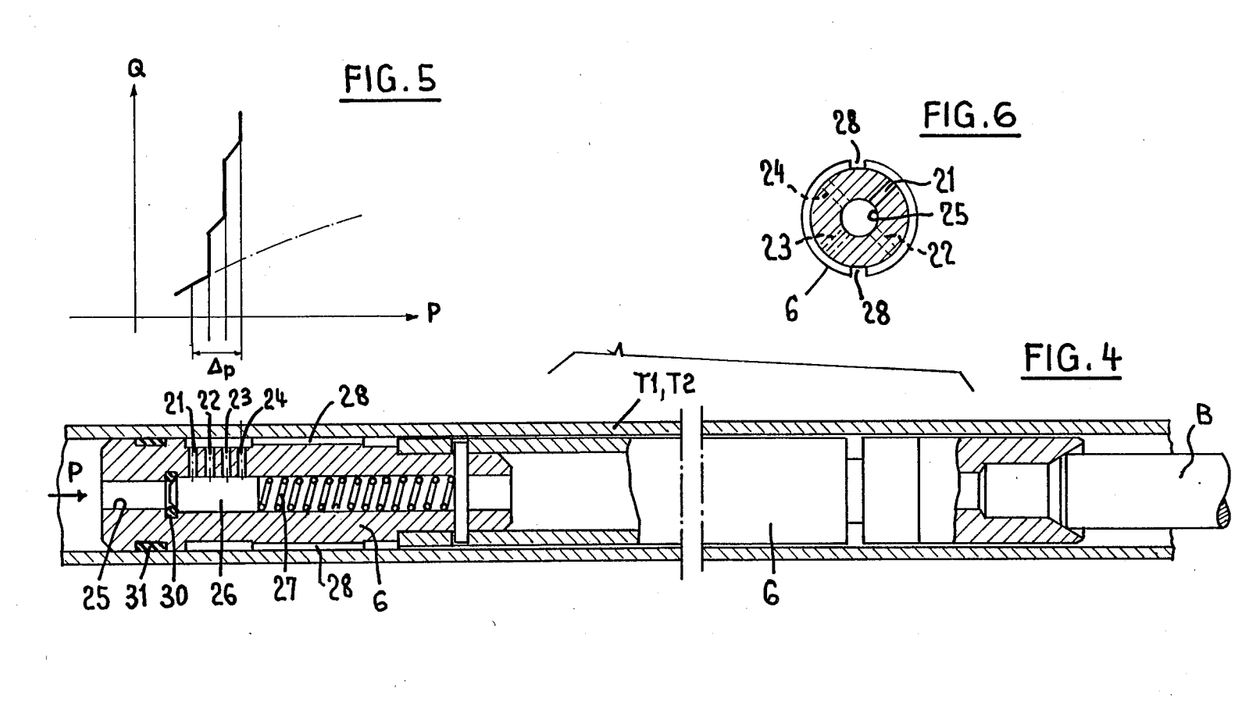
FIG. 4 is a longitudinal section of the push-piston in the guiding tube.
FIG. 5 is a diagram showing the flow of oil as a function of oil pressure.
FIG. 6 shows a variant of the arrangement of the lateral openings of the push-button of FIG. 4.

To this end, and as shown in FIG. 4, the push-piston 6 comprises internal, radial, distribution openings 21, 22, 23 and 24 connected to an inlet of oil 25 at the back of the push-piston 6 through a flow regulating valve 26 actuated against the force of a return spring 27 by the oil pressure P at the back of the push-piston. The openings 21–24 are in connection with longitudinal grooves 28 at the external face of the push-piston and they permit the passage of oil from the back of the push-piston to the annular space defined between the bar stock and the internal wall of its floating guiding tube T2. FIG. 5 illustrates how the flow of oil is adjusted as a function of the pressure P acting at the back of the push-piston. FIG. 6 shows that instead of arranging the distribution openings 21–24 in one and the same plane, it is also possible to distribute them in a helix surrounding the push-piston. In the position illustrated in FIG. 4, the regulating valve 26 is in contact with a tight joint 30 in order to prevent air from the outside from entering into the pressure chamber at the back of the push-piston when the pressure of oil in this chamber is eliminated and replaced by vacuum for aspirating the push-piston towards the back of the device when it is necessary to load a new bar stock to be machined in the guiding element. Another tight joint 31 is provided at the external face of the push-piston, at the back of the latter, for preventing any suction of air between the push-piston and the guiding tube when the push-piston is withdrawn by vacuum.

When a bar stock to be machined is engaged in the floating tube T2 and set into rotation by the head stock of the lathe, the hydraulic group is switched on for delivering oil under pressure and the bar stock is pushed by the push-piston towards the lathe. The preceding shows that the push-piston has two different purposes: first, to control the advance of the bar stock towards the lathe and further to supply oil under pressure into the annular space between the internal wall of the floating tube and the bar stock. The lateral injectors 8, 9 (FIG. 1) permit an injection of oil under pressure in the annular space existing between the internal wall of the fixed tube T1 and the external face of the floating tube T2.

When the bar stock is set into rotation by the head stock of the lathe, this rotation causes between the bar stock and its guiding tube a hydraulic turbulence forming a hydrodynamic bearing for the rotating bar stock. The rotation of this oil bearing sets in turn the floating tube into rotation which causes also a hydrodynamic bearing between the floating tube T2 and the fixed tube T1.

By comparison with the known, existing devices which comprise only a single, fixed guiding tube, the guiding element according to the present invention with a fixed tube and a floating tube has the following advantages. It permits a substantial increase, i.e. of 30 to 40% in the speed of rotation of the bar stock (up to 18,000 t/min), due to the fact that the hydrodynamic effect is distributed on two bearings instead of one. In fact, the speed of rotation of the hydrodynamic bearing between the floating tube and the bar stock is reduced because of the rotation of the floating tube in the fixed tube. Similarly, the speed of rotation of the hydrodynamic bearing between the fixed tube and the floating tube is also reduced because of the rotation of the floating tube in the fixed tube. This permits a substantial increase of the speed of rotation of the bar stock due to the above mentioned distribution on two bearings which prevent, even at very high speeds of rotation of the bar stock, the formation of foam in the oil which inevitably occurs when the turbulence of the oil reaches a determined level. The presence of foam reduces the viscosity of the oil and consequently the efficacy of the hydrodynamic bearing.

It has been found that it is desirable to be able to calibrate the oil flow between the bar stock and its guiding tube in dependence on the sections of the bar stock, the play between the bar stock and the guiding tube and the speeds of rotation to be reached. The known push-pistons permit such a calibration by a manual action on the push-piston. This operation necessitates stopping the machine, and withdrawing the bar stock and the push-piston from the front part of the guiding tube. However, the push-piston according to the invention, as illustrated in FIG. 4, offers the advantage that the calibration of the flow of oil is achieved simply and solely by the variation of the pressure of oil P at the back of the push-piston. An increase of the pressure causes a shifting of the regulating valve 26 towards the right in FIG. 4 which permits the passage of oil through one or more of the openings 21–24 (see also FIG. 5). This offers the very important advantage of permitting adjustment and optimization of the effect of hydrodynamic bearing while the device is working, the bar stock being set into rotation within its guiding tube.

It is clear that if the speed of rotation required for the bar stock to be machined is not extreme, it is possible to provide the device according to the invention with a single, fixed guiding tube while retaining of all above mentioned advantages provided by the push-piston according to the invention. In this case, the lateral injectors 8, 9 between the channel 10 and the guiding tube are in principle superfluous.

Figure 7:
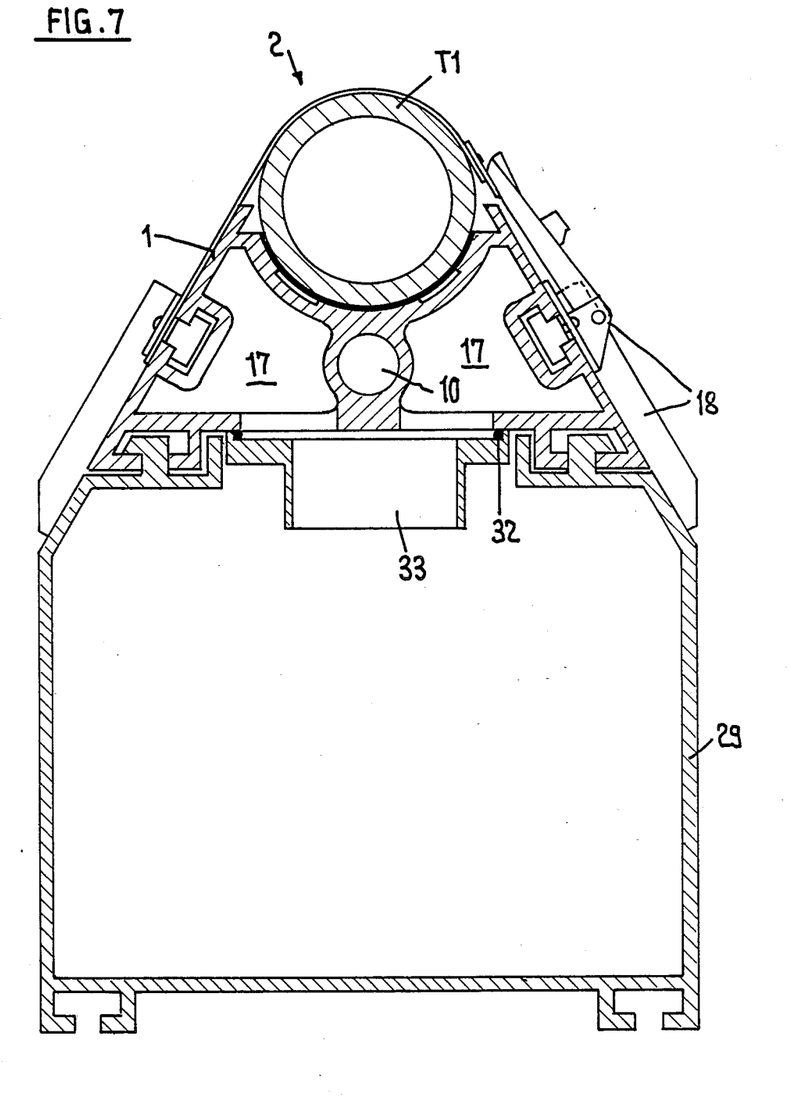
FIG. 7 is a cross section of the device in association with a box.

In order to increase the rigidity and the stability of the device in the case of very high speeds of rotation of the bar stock to be machined, one may foresee a closed pedestal or box 29 secured to the sectional carrier 1 as shown in FIG. 7. The box is held in ribs of the sectional carrier 1 and a tight joint 32 is provided around its central part in order to prevent leakage of oil to the outside, the oil flowing from the chambers 17 into the inlet 33 of the box 29. Such a pedestal contributes to increase the moment of inertia and consequently the stability of the device. Pedestal may also be integral with the sectional carrier 1. Moreover it is possible to utilize the box 29 as a tank in which one may place the hydraulic group, the oil pump (see FIG. 1) and the hydraulic connections between the hydraulic group and the device which simplifies the hydraulic connections while reducing the manufacturing costs. The device according to FIG. 7 with the sectional carrier 1 and the tank 29 may be considered as an autonomous unit to be mounted on single spindle lathes.

As mentioned in the introduction, the three aspects of the present invention contribute to increase the stability of the device, to increase the speeds of rotation of the bar stock up to very high values (18,000 t/min) without reducing the machining accuracy, to permit an easy and rapid exchange of the guiding element which is fastened by rapid action locking clamps and to simplify the design of the device. More particularly, the absence of seats necessitating an assembly of precision contributes to reduce the manufacturing costs of the device.

We claim:

1. A guide bar device for a single spindle lathe, comprising:
    a guiding means for rotatably supporting a length of bar stock, said guiding means comprising a fixed tube and a free tube disposed inside said fixed tube, said free tube being adapted to rotatably receive a length of bar stock herein;
    a sectional carrier means for supporting said guiding means, said sectional carrier means being removably secured to said guiding means;
    a push-piston means, at least partially disposed in said guiding means, for controlling advancement of the bar stock;
    an injection means, hydraulically coupled to said push-piston means, for distributing fluid, said injection means comprising:
        a first means for supplying pressurized fluid to said free tube and said fixed tube whereby a first hydrodynamic bearing is created between said bar stock and said free tube and a second hydrodynamic bearing is created between said free tube and said fixed tube, said first means comprising:
        a second means for supplying pressurized fluid to a first end of said push-piston means; and
        a distribution channel means, formed in said sectional carrier means, for distributing pressurized fluid to said guiding means; and
    a return channel means for returning fluid from said guiding means to said injection means.

2. A device according to claim 1, wherein said distribution channel means distributes fluid under pressure between said fixed tube and said free tube, whereby fluid injected between said fixed and free tubes forms said second hydrodynamic bearing which supports said free tube.

3. A device according to claim 1, wherein said fixed tube comprises a single guiding tube removably secured to said sectional carrier means, said guiding tube enclosing said push-piston means and being adapted to enclose a longitudinal extent of bar stock.

4. A device according to claim 3, wherein said second means comprises an axially displacable flow regulating valve means responsive to fluid supplied to said first end of said push-piston means for adjusting a rate of flow of fluid to said push-piston means.

5. A device according to claim 1, wherein said second means comprises a flow regulating valve means, responsive to said pressurized fluid supplied to said first end of said push-piston means, for adjusting the rate of flow of fluid into said guiding means.

6. A device according to claim 5, further comprising:
a plurality of radially extending openings formed in said push-piston means; and
a plurality of longitudinal passages for delivering fluid from said openings to said guiding means,
said flow regulating valve means being axially displaceable within said push-piston means whereby displacement of said flow regulating valve establishes a fluid communication path from said first end of said push-piston means to said guiding means.

7. A device according to claim 6, wherein said push-piston means is completely disposed in guiding means, and further comprising:
a first joint means for sealing a junction between said flow regulating valve and said push-piston means; and
a second joint means for sealing a junction between said push-piston means and said guiding means.

8. A device according to claim 1, wherein said sectional carrier means is of closed cross-section and comprises a curved bed for receiving said guiding means.

9. A device according to claim 8, wherein said distribution channel means extends along an entire length of said sectional carrier means and comprises a radial opening for communication with said guiding means.

10. A device according to claim 9, wherein said distribution channel means comprises lateral walls connecting said curved bed to a base portion, and wherein said sectional carrier means includes outer walls, said return channel means comprising said outer walls and said lateral walls.

11. A device according to claim 8 wherein said distribution channel means distributes fluid under pressure between said fixed tube and said free tube, whereby fluid injected between said fixed and free tubes forms said second hydrodynamic bearing which supports said free tube.

12. A device according to claim 8, wherein said second means further comprises a flow regulating valve means, responsive to said pressurized fluid supplied to said first end of said push-piston, for adjusting the rate of flow of fluid into said guiding means.

13. A device according to claim 12, further comprising:
a plurality of radially extending openings formed in said push-piston means; and
a plurality of longitudinal passages for delivering fluid from said openings to said guiding means,
wherein said flow regulating valve means is axially displaceable within said push-piston means, and whereby displacement of said flow regulating valve establishes a fluid communication path from said first end of said push-piston means to said guiding means.

14. A device according to claim 6, wherein said push-piston means is completely disposed in said guiding means, and further comprising:
a first joint means for sealing a junction between said flow regulating valve and said push-piston means; and
a second joint means for sealing a junction between said push-piston means and said guiding means.

15. A device according to claim 8, wherein said fixed tube further comprises a single guiding tube removably secured to said sectional carrier means, said guiding tube enclosing said push-piston and being adapted to enclose the bar stock.

16. A device according to claim 15, wherein said second means comprises an axially displaceable flow regulating valve means responsive to said fluid supplied to said first end of said push-piston for adjusting a rate of flow of fluid supplied from said first means.

17. A device according to claim 8, further comprising a pedestal means secured to said sectional carrier and adapted to enclose a hydraulic source means for supplying fluid to said injection means.

18. A device according to claim 17, wherein said distribution channel extends along an entire length of said sectional carrier means and comprises a radial opening for communication with said guiding means.

19. A device according to claim 18, wherein said distribution channel means comprises lateral walls connecting said curved bed to said base portion, and wherein said sectional carrier means includes outer walls, said return channel means comprising said outer walls and said lateral walls.

20. A device according to claim 17, wherein said distribution channel means distributes fluid under pressure between said fixed tube and said free tube, whereby fluid injected between said fixed and free tubes forms said second hydrodynamic bearing.

21. A device according to claim 17, wherein said first means further comprises a flow regulating valve means, responsive to said pressurized fluid supplied to said first end of push-piston means, for adjusting the rate of flow of fluid into said guiding means.

22. A device according to claim 21, further comprising:
a plurality of radially extending openings formed in said push-piston means; and
a plurality of longitudinally passages for delivering fluid from said openings to said guiding means,
said flow regulating valve means being axially displaceable within said push-piston means, whereby displacement of said flow regulating valve means establishes a fluid communication path from said first end of said push-piston means to said guiding means.

23. A device according to claim 22, wherein said push-piston means is completely disposed in said guiding means, and further comprising:
a first joint means for sealing a junction between said flow regulating valve means and said push-piston means; and 24. A device according to claim 17, wherein said fixed tube comprises a single guiding tube removably secured to said sectional carrier means, said guiding tube enclosing said push-piston and being adapted to close the bar stock.
a second joint means for sealing a junction between said push-piston means and said guiding means.

25. A device according to claim 24, wherein said second means comprises an axially displaceable flow regulating valve means responsive to said fluid supplied to said first end of said push-piston for adjusting a rate of flow of fluid supplied from said first means.

* * * * *

UNITED STATES PATENT AND TRADEMARK OFFICE
CERTIFICATE OF CORRECTION

PATENT NO. : 4,889,024
DATED : December 26, 1989
INVENTOR(S) : MARKUS GEISER et al.

It is certified that error appears in the above—identified patent and that said Letters Patent is hereby corrected as shown below:

Title page:
　　Item [30] Foreign Application Priority Data "October 9, 1985" should be --September 10, 1985--;

Column 8:
　　Claim 21, line 34, "first" should be --second--;

Claim 23, line 55, after "means; and" add --a second joint means for sealing a junction between said push-piston means and said guiding means;--;

Claim 24, lines 61 and 62, delete "a second joint means for sealing a junction between said push-piston means and said guiding means".

Signed and Sealed this

Eighteenth Day of August, 1992

Attest:

DOUGLAS B. COMER

Attesting Officer　　Acting Commissioner of Patents and Trademarks